(12) United States Patent
Ps et al.

(10) Patent No.: US 9,158,374 B2
(45) Date of Patent: Oct. 13, 2015

(54) METHOD, APPARATUS AND COMPUTER PROGRAM PRODUCT FOR DISPLAYING MEDIA CONTENT

(75) Inventors: Sanjeev Ps, Bangalore (IN); Sivanand Jothy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 481 days.

(21) Appl. No.: 13/451,335

(22) Filed: Apr. 19, 2012

(65) Prior Publication Data

US 2012/0274562 A1     Nov. 1, 2012

(30) Foreign Application Priority Data

Apr. 28, 2011     (IN) .................... 1469/CHE/2011

(51) Int. Cl.
*G06F 3/01*     (2006.01)
*H04N 1/387*    (2006.01)
*G06F 3/0485*   (2013.01)

(52) U.S. Cl.
CPC .............. G06F 3/012 (2013.01); G06F 3/0485 (2013.01); H04N 1/387 (2013.01)

(58) Field of Classification Search
CPC .......... G06K 9/00221; G06K 9/00228; G06K 9/00234; G06K 9/00241; G06K 9/00248; G06K 9/00255; G06K 9/00261; G06K 9/00268; G06K 9/00275; G06K 9/00281; G06K 9/00288; G06K 9/00295; G06K 9/00302; G06K 9/00305; G06K 9/00315; G06K 9/22; G06K 9/00664; G06K 9/00677; G06K 9/6267; G06K 9/46; G06F 17/30247
USPC ................. 715/202, 730–732; 382/115, 118
See application file for complete search history.

(56) References Cited

U.S. PATENT DOCUMENTS

| | | | |
|---|---|---|---|
| 5,596,346 A | 1/1997 | Leone et al. | |
| 6,633,223 B1* | 10/2003 | Schenker et al. | 340/5.53 |
| 6,864,912 B1* | 3/2005 | Mahaffey et al. | 348/61 |
| 7,551,755 B1* | 6/2009 | Steinberg et al. | 382/118 |
| 7,711,145 B2* | 5/2010 | Gallagher | 382/103 |
| 7,822,233 B2 | 10/2010 | Nagaoka et al. | |
| 8,446,479 B2* | 5/2013 | Uemura et al. | 348/220.1 |
| 8,810,684 B2* | 8/2014 | Chang | 348/231.1 |
| 2002/0073077 A1* | 6/2002 | Lennon | 707/3 |
| 2004/0207743 A1* | 10/2004 | Nozaki et al. | 348/333.12 |
| 2006/0219776 A1* | 10/2006 | Finn | 235/380 |
| 2007/0113099 A1* | 5/2007 | Takikawa et al. | 713/186 |
| 2007/0172155 A1* | 7/2007 | Guckenberger | 382/305 |
| 2008/0240563 A1 | 10/2008 | Takano et al. | |
| 2009/0103887 A1 | 4/2009 | Choi et al. | |

(Continued)

FOREIGN PATENT DOCUMENTS

GB     2448050 A     10/2008
WO     WO 2010085221 A1 *     7/2010     ................ G06F 3/01

OTHER PUBLICATIONS

International Search Report and Written Opinion received for corresponding International Patent Application No. PCT/FI2012/050253, dated Jun. 12, 2012, 13 pages.

*Primary Examiner* — Andrew Dyer
(74) *Attorney, Agent, or Firm* — Harrington & Smith (57) ABSTRACT

In accordance with an example embodiment a method and apparatus is provided. The method comprises receiving at least one face as an input. A presence of the at least one face in a media content is determined and a modified display of the media content is generated if the at least one face is determined to be present in the media content.

16 Claims, 5 Drawing Sheets

(56) References Cited

U.S. PATENT DOCUMENTS

| | | |
|---|---|---|
| 2009/0110246 A1* | 4/2009 | Olsson et al. ............... 382/118 |
| 2009/0136094 A1 | 5/2009 | Driver et al. |
| 2009/0178126 A1* | 7/2009 | Du et al. ...................... 726/6 |
| 2009/0185033 A1 | 7/2009 | Nozaki ......................... 348/77 |
| 2009/0220128 A1* | 9/2009 | Irimoto et al. ............... 382/118 |
| 2010/0150407 A1* | 6/2010 | Cheswick ..................... 382/118 |
| 2010/0177193 A1 | 7/2010 | Flores |
| 2010/0272368 A1 | 10/2010 | Su et al. |
| 2010/0315497 A1 | 12/2010 | Jiang |
| 2011/0007191 A1 | 1/2011 | Song et al. |
| 2011/0064281 A1 | 3/2011 | Chan |

* cited by examiner

METHOD, APPARATUS AND COMPUTER PROGRAM PRODUCT FOR DISPLAYING MEDIA CONTENT

RELATED APPLICATION

This application claims priority benefit to Indian Patent Application Number 1469/CHE/2011, filed Apr. 28, 2011, which is incorporated herein in its entirety by reference.

TECHNICAL FIELD

Various implementations relate generally to method, apparatus, and computer program product for displaying media content.

BACKGROUND

The rapid advancement in technology related to capture and display of media content has resulted in an exponential growth in tools related to media content creation. Devices like mobile phones and personal digital assistants (PDA) are now being increasingly configured with video capture tools, such as a camera, thereby facilitating easy capture of media content.

The media content available at the device may be provided as an output by using various output means for example, a display, speaker, and the like. In an example, where the captured media content includes a number of people, for example a group photo, it is common to have individuals interested in viewing how he/she looks in the media content.

SUMMARY OF SOME EMBODIMENTS

Various aspects of examples embodiments are set out in the claims.

In a first aspect, there is provided a method comprising: receiving at least one face as an input in a multimedia device; determining a presence of the at least one face in a media content in the multimedia device; and generating a modified display of the media content if the at least one face is determined to be present in the media content.

In a second aspect, there is provided an apparatus comprising: at least one processor; and at least one memory comprising computer program code, the at least one memory and the computer program code configured to, with the at least one processor, cause the apparatus at least to perform: receiving at least one face as an input; determining a presence of the at least one face in a media content; and generating a modified display of the media content if the at least one face is determined to be present in the media content.

In a third aspect, there is provided a computer program product comprising at least one computer-readable storage medium, the computer-readable storage medium comprising a set of instructions, which, when executed by one or more processors, cause an apparatus to at least perform: receiving at least one face as an input; determining a presence of the at least one face in a media content; and generating a modified display of the media content if the at least one face is determined to be present in the media content.

In a fourth aspect, there is provided an apparatus comprising: means for receiving at least one face as an input; means for determining a presence of the at least one face in a media content; and means for generating a modified display of the media content if the at least one face is determined to be present in the media content.

In a fifth aspect, there is provided a computer program comprising program instructions which when executed by an apparatus, cause the apparatus to: receive at least one face as an input; determine a presence of the at least one face in a media content; and generate a modified display of the media content if the at least one face is determined to be present in the media content.

BRIEF DESCRIPTION OF THE FIGURES

The embodiments of the invention are illustrated by way of example, and not by way of limitation, in the figures of the accompanying drawings in which.

DETAILED DESCRIPTION

Example embodiments and their potential effects are understood by referring to FIGS. 1 through 4 of the drawings.

Figure 1:
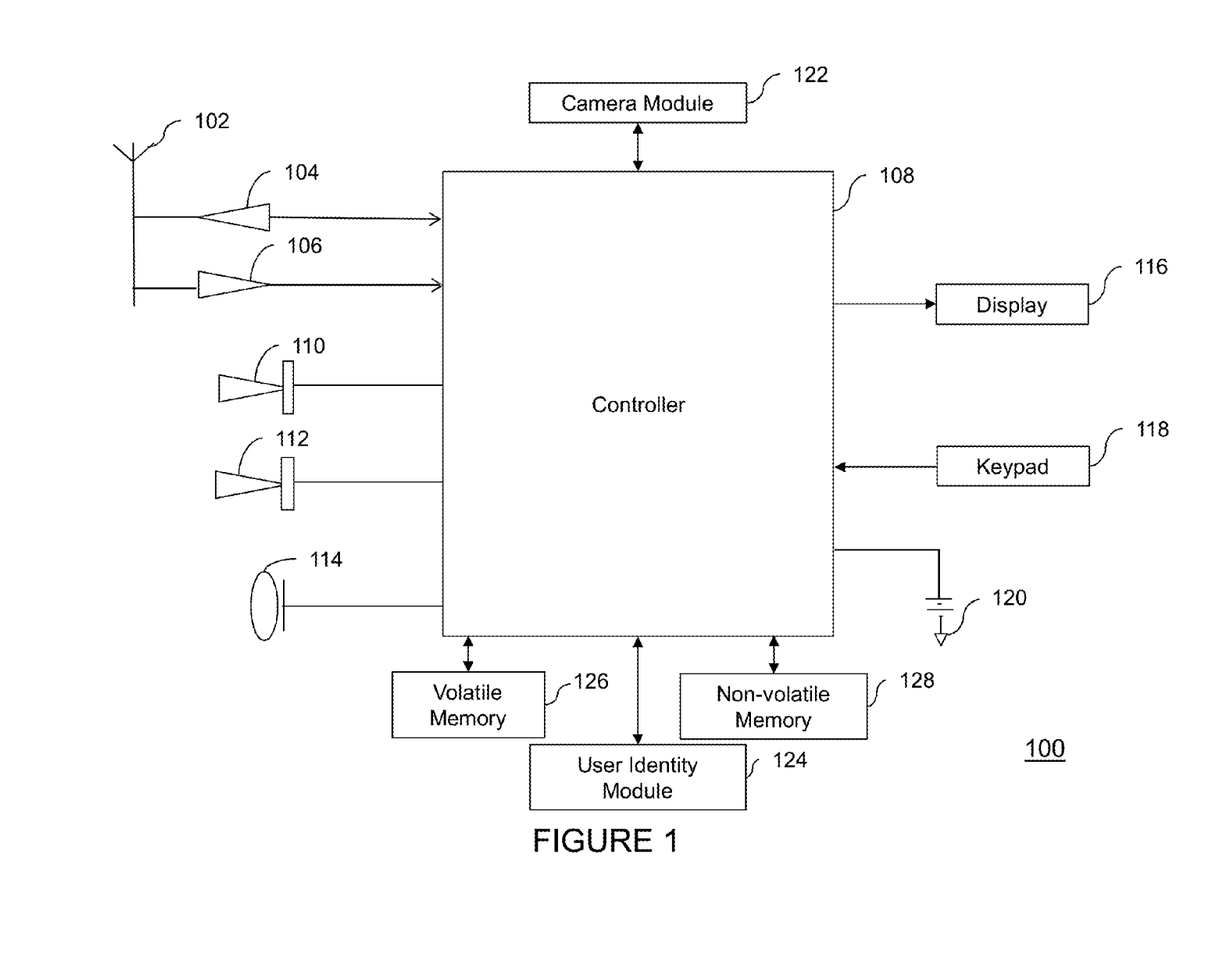
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of electronic devices, mobile communication devices, media devices or any combination of the aforementioned, and other types of communications devices. Examples of electronic devices may include all types of computers (for example, laptops, mobile computers, desktops or tablets), cameras, non-portable displays, such as non-portable televisions, digital photo frames, gaming devices and the like. Examples of mobile communication devices may include cellular phones, smart phones, portable digital assistants (PDAs), pagers and the like. Examples of media devices may include multimedia devices like media players, mobile digital assistants and the like.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capture element, such as a camera, video and/or audio module, in communication with the controller 108. The media capturing element may be any means for capturing an image, video and/or audio for storage, display or transmission. In an example embodiment in which the media capture element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include only the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the same side of the device 100 with respect to the display 116. Alternatively, the display 116 may be located on one side of the device 100 and the camera module 122 may include a lens positioned on both sides of the device 100 with respect to the display 116 to enable the camera module 122 to capture images on both sides of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
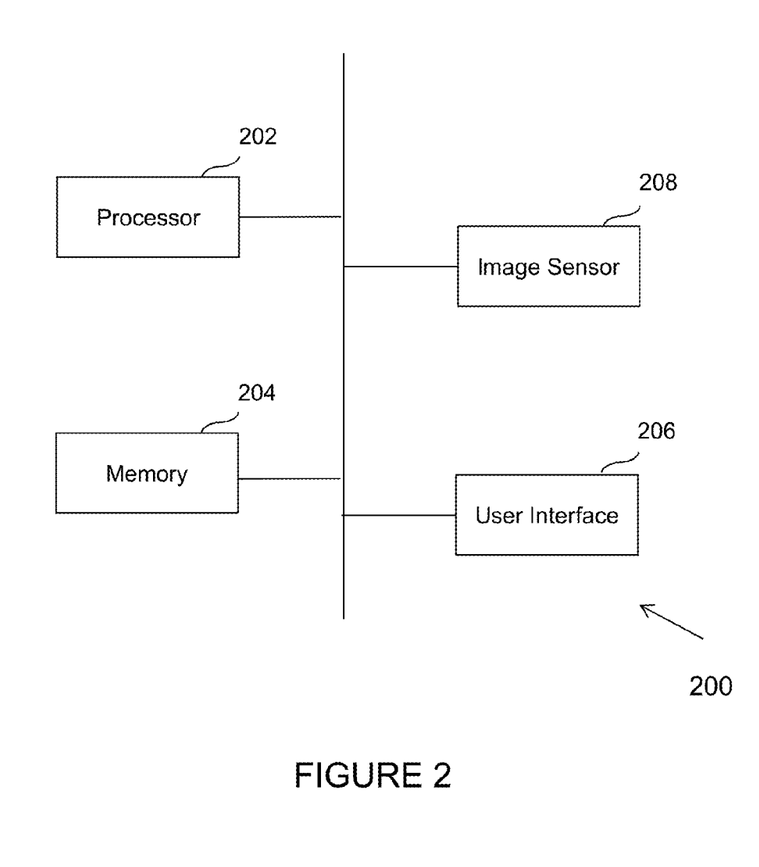
FIG. 2 illustrates an apparatus for displaying media content in accordance with an example embodiment.

FIG. 2 illustrates an apparatus 200 for displaying media content in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. In an example embodiment, the apparatus is a multimedia device. In another example embodiment, the apparatus 200 is a mobile phone, which may be an example of a multimedia device with communication capabilities. Alternatively or additionally, embodiments may be employed on a combination of devices including, for example, those listed above. Accordingly, various embodiments may be embodied wholly at a single device, for example, the device 100 or in a combination of devices. It should be noted that some devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some example of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions and the like for enabling the apparatus 200 to carry out various functions in accordance with various example embodiments. For example, the memory 204 may be configured to buffer input data comprising multimedia content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

An image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. In an example embodiment, the image sensor 208 may be provided on the same side of the apparatus 200 as the display.

In an example embodiment, the processor 202 is configured to, with the content of the memory 204, and optionally with other components described herein, to cause the apparatus 200 to display media content to a user. Examples of the media content may include image content, video content, and the like. Examples of image content may include still pictures, for example, photos captured using the image sensor 208 or pictures received from an external device and stored locally in the memory 204. Examples of the video content may include may include motion pictures, for example, videos captured using the image sensor 208, or videos received from the external device and stored locally in the memory 204. The media content may be displayed to one or more users.

In an example embodiment, the processor 202 is configured to, with the content of the memory 204, and optionally with other components described herein, to cause the apparatus 200 to receive at least one face as an input. The at least one face may be associated with at least one viewer of the media content. In an example embodiment, the processor 202 is configured to, with the content of the memory 204, and optionally with other components described herein, to cause the apparatus 200 to perform switching of the image sensor 208 to an ON state upon display of the media content. The image sensor 208 may be switched to an ON state upon display of the media content to one or more users desiring to view the media content. The image sensor 208 in the switched ON state may receive at least one face as the input by detecting one or more faces in its field of view. The image sensor 208 may utilize face detection techniques for detecting the faces of the one or more users viewing the media content and receive the detected faces as input. In an example embodiment, a processing means may be configured to perform switching of the image sensor 208 to an ON state upon display of the media content. An example of the processing means may include the processor 202, which may be an example of the controller 108.

In an example embodiment, the processor 202 is configured to, with the content of the memory 204, and optionally with other components described herein, to cause the apparatus 200 to determine a presence of the face of the one or more users in the media content. In an example embodiment, the apparatus 200 may be configured to perform a comparison of the one or more faces received as input (for example, detected faces in the field of view of the image sensor 208) with the faces present in the media content for a match. For example, if the captured media content is a group photo and a number of users are viewing the display of the group photo, then the image sensor 208 may be switched to ON state upon display of the media content and perform face detection in its field of view. Upon detecting the faces of the number of users, the apparatus 200 may be configured to perform a comparison of the detected faces in its field of view with the faces present in the group photo for a match. In an example embodiment, determining the presence of the faces in the media content may include performing face recognition of the faces in the media content. Typical face recognition techniques may be utilized for face detection and subsequent comparison of the detected faces with the faces present in the media content for a match. In an example embodiment, a processing means may be configured to determine a presence of the face of the one or more users in the media content. An example of the processing means may include the processor 202, which may be an example of the controller 108.

In an example embodiment, the processor 202 is configured to, with the content of the memory 204, and optionally with other components described herein, to cause the apparatus 200 to generate a modified display of the media content if the presence of the one or more faces is determined in the media content. For example, on comparison of the detected faces in the field of view of the image sensor 208 with the faces present in the media content for a match, if a match is found, then the modified display of the media content may be generated to provide a personalized display of the media content to the users. In an example embodiment, the modified display includes one of a panned image and a zoomed image of a user viewing the media content if the presence of the face of the user is determined in the media content. Thus, the localized region of interest of the viewer is panned/zoomed for enhancing a user's viewing experience. In an example embodiment, a processing means may be configured to generate a modified display of the media content if the presence of the face is determined in the media content. An example of the processing means may include the processor 202, which may be an example of the controller 108

In another example embodiment, if the presence of more than one detected face is determined in the media content, then the modified display including a slide show presentation of the panned/zoomed image of the detected faces in the media content may be generated and presented to the users for viewing purposes. In another example embodiment, if the presence of more than one face is determined in the media content, then the modified display including a tile format presentation of the panned/zoomed image of the detected faces in the media content may be generated and presented to the users for viewing purposes. In an example embodiment, the media content may be configured to be modified to sepia tinted or a translucent form and the tile including panned/zoomed images of the detected faces in the media content displayed over the media content. Such exemplary modified displays are depicted in FIGS. 3B to 3F.

In one example embodiment, the media content is a captured video content. On displaying the video content to users, the image sensor 208 may be configured to receive at least one face as an input, for example by detecting faces in its field of view and comparing the detected faces of the users with the video content being displayed. Modified display of the video content may be generated if the presence of the detected faces of the viewers is determined in the video content being displayed to the users. In one example embodiment, a user on viewing the displayed media content may provide the media content to another user for viewing purposes. The image sensor 208 may receive the face of the new user as an input and determine a presence of the face in the displayed media content. If the presence of the face is determined in the media content, then a modified display may be generated for the new user for providing a personalized display of the media content.

In an example embodiment, the apparatus 200 may include a multimedia device. Some examples of the multimedia device include a computing device, a communication device, a media playing device and the like. Some examples of computing device may include a laptop, a personal computer, and the like. Some examples of the communication device may include a mobile phone, a personal digital assistant (PDA), and the like. Some examples of the media playing device may include audio/video players, cameras and the like. In an example embodiment, the multimedia device may be a communication device including an image sensor, such as the image sensor 208. The image sensor, along with other components may be configured to facilitate a user to capture images or videos of human faces. An example of the image sensor and the other components may be the camera module 122. The communication device may comprise a user interface circuitry and user interface software configured to facilitate a user to control at least one function of the communication device through use of a display and further configured to respond to user inputs. The user interface circuitry may be similar to the user interface explained in FIG. 1 and the description is not included herein for sake of brevity of description. Additionally or alternatively, the communication device may include a display circuitry configured to display at least a portion of a user interface of the communication device, the display and display circuitry configured to facilitate the user to control at least one function of the communication device. Additionally or alternatively, the communication device may include typical components such as a transceiver (such as transmitter 104 and a receiver 106), volatile and non-volatile memory (such as volatile memory 126 and non-volatile memory 128), and the like. The various components of the communication device are not included herein for the sake of brevity of description.

Figure 3A:
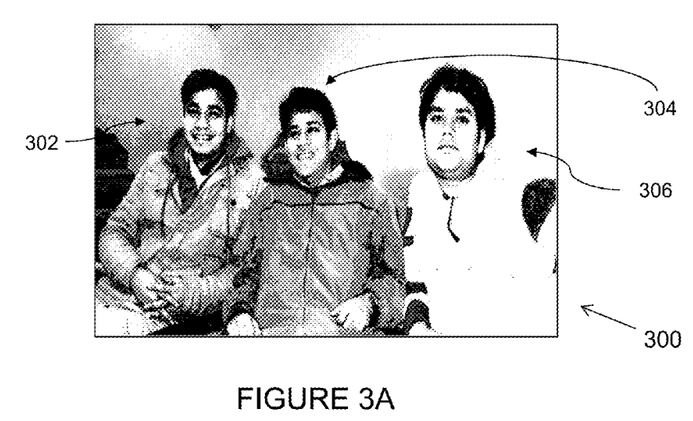
FIG. 3A illustrates a display screen depicting exemplary media content displayed to a user.

FIG. 3A illustrates a display screen 300 depicting exemplary media content displayed to a user. The display screen 300 may be an example of the display 116 of the device 100 or user interface 208 of the apparatus 200. The media content displayed on the display screen 300 includes image content. For example, the media content displayed on the display screen 300 depicts a photograph including three individuals. The individuals 302, 304 and 306 will hereinafter be referred to as individual A, individual B and individual C respectively. The image sensor 208 of the apparatus 200 may have captured the photograph displayed on the display screen 300. Each of the individuals A, B and C may be interested in viewing the photograph to see how he looks in the photograph. Once the display of the photograph is triggered on the display screen 300, the image sensor 208 may switch to an ON state and perform detection of faces of viewers in its field of view. On detecting face of a viewer in its field of view, a presence of the detected face in the photograph may be determined. If the presence of the face is determined in the photograph, then a modified display of the photograph may be generated. Examples of generated modified displays are depicted in FIGS. 3B to 3E.

Figure 3B:
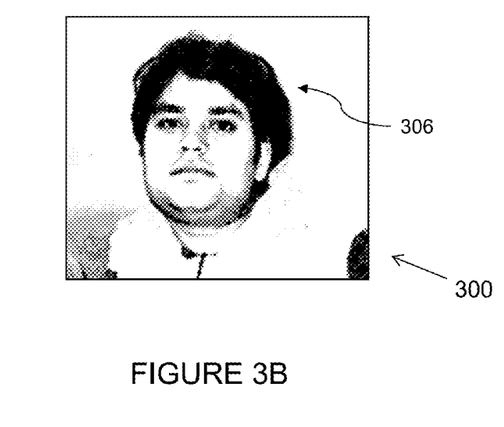
FIGS. 3B and 3C illustrate modified displays generated upon determining a presence of a face of a user in the media content in accordance with an example embodiment.
Figure 3C:
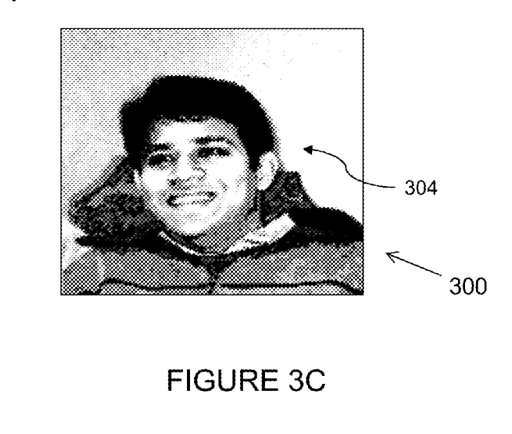

FIGS. 3B and 3C illustrate modified displays generated upon determining a presence of a face of a user in the media content in accordance with an example embodiment. If individual C views the photograph displayed on the display screen 300, then the image sensor 208 receives a face of the individual C as an input and a presence of the face of individual C in the photograph is determined. On determination of the presence of the face of individual C in the photograph, a zoomed photo of the individual C is displayed to the individual C as depicted in FIG. 3B. On viewing the modified display, the individual C may provide the display screen 300 to individual B for viewing purposes. On arrival of the individual B in the field of view of the image sensor 208, a face of the individual B may be received as the input, and a presence of the face of the individual B in the photograph is determined. On determination of the presence of the face of individual B in the photograph, a zoomed photo of the individual B is displayed to the individual B as depicted in FIG. 3C. Thus, a personalized display of the media content may be provided to the users.

Figure 3D:
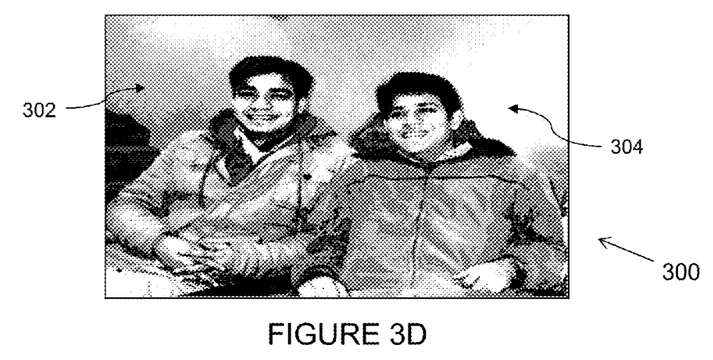
FIGS. 3D, 3E and 3F illustrate modified displays generated upon determining a presence of faces of users in the media content in accordance with another example embodiment.

FIGS. 3D, 3E and 3F illustrate modified displays generated upon determining a presence of faces of users in the media content in accordance with an example embodiment. If individual A and individual B view the photograph displayed on the display screen 300, simultaneously, then the image sensor 208 receives, faces of the individuals A and B as input and checks for a presence of the faces of individual A and B in the photograph. On determination of the presence of the faces of individual A and B in the photograph, a zoomed photo of the individuals A and B is displayed to the individuals A and B as depicted in FIG. 3D. In an example embodiment, a slide show presentation of the zoomed photos of individuals (such as zoomed photo of the individual B in FIG. 3C) may be provided to the individuals A and B.

Figure 3E:
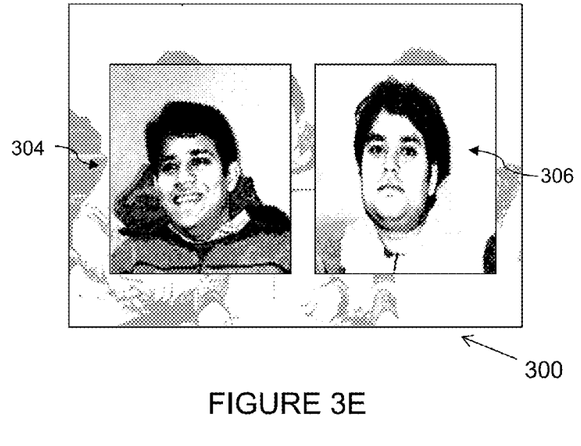
Figure 3F:
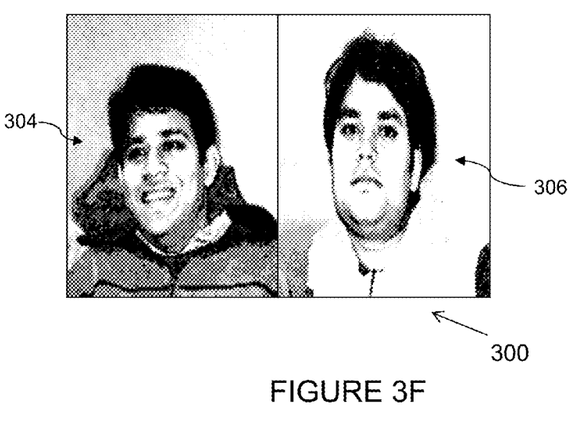

In another example embodiment a tile format presentation of the zoomed photo of individuals, for example, individuals A and B may be provided to the viewing individuals A and B as depicted in display screen 300 of FIG. 3D. The tiles including zoomed photos of the individuals B and C may be imposed over sepia tinted photograph or translucent image of the photograph as depicted in display screen 300 of FIG. 3E. In another example embodiment, the tiles including the zoomed photos of the individuals B and C may be resized to fit the original photograph size and displayed on the display screen 300 as depicted in FIG. 3F. Various such possible modified displays may be generated for providing a personalized viewing display to the users and enhance their viewing experience and the modified displays depicted in FIGS. 3B to 3F may not be considered to be limiting the scope of the various embodiments. A method for displaying the media content is explained in FIG. 4.

Figure 4:
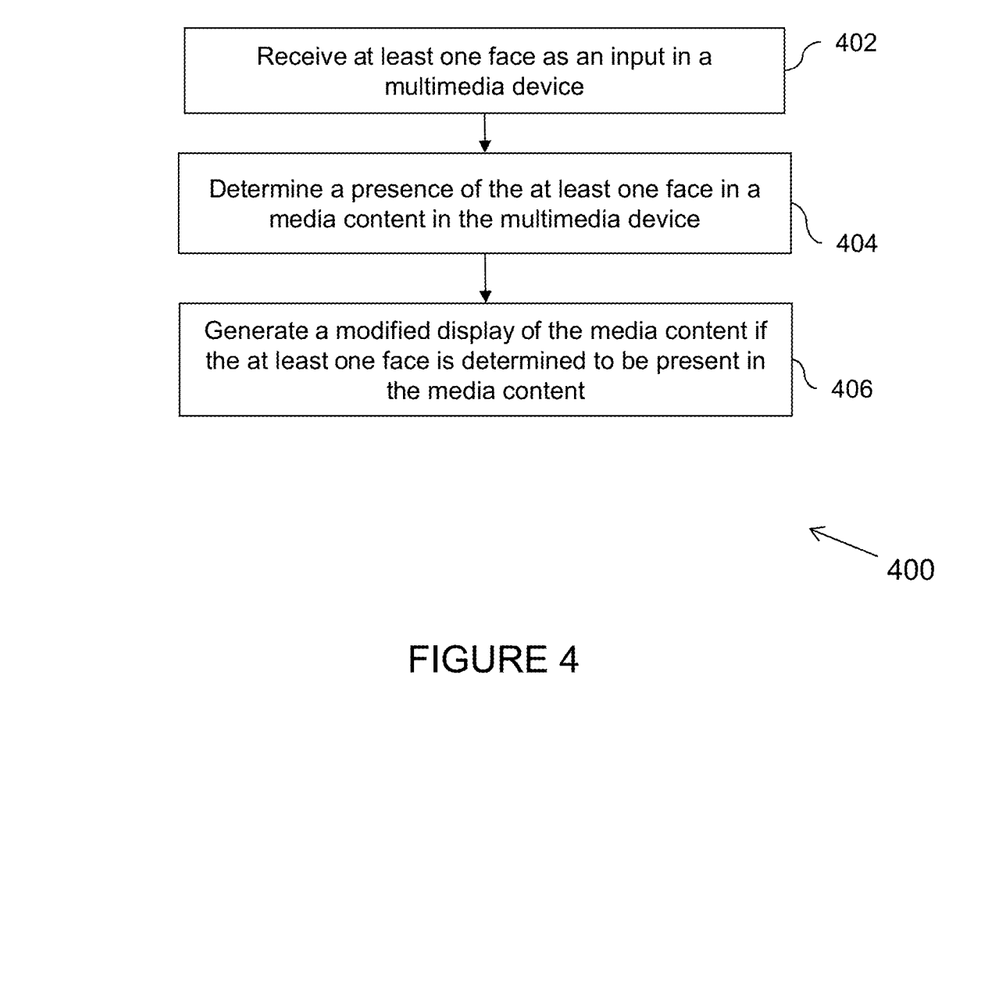
FIG. 4 is a flowchart depicting an example method for displaying media content in accordance with an example embodiment.

FIG. 4 is a flowchart depicting an example method 400 for displaying media content in accordance with another example embodiment. The method 400 depicted in flow chart may be executed by, for example, the apparatus 200 of FIG. 2.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the method 400 are described with help of apparatus 200. However, the operations of the method 400 can be described and/or practiced by using any other apparatus.

The media content may be image content, video content, and the like. Examples of image content may include still pictures, for example, photos captured using an image sensor, for example, image sensor 208, or pictures received from an external device and stored locally in the memory 204. Examples of the video content may include may include motion videos, for example, videos captured using the image sensor or videos received from the external device and stored locally in the memory 204. At block 402, at least one face is received as an input in a multimedia device. Examples of the multimedia device could be any of a number of types of electronic devices, mobile communication devices, media devices or any combination of the aforementioned devices. Examples of electronic devices may include all types of computers (for example, laptops, mobile computers, desktops or tablets), cameras, non-portable displays, such as non-portable televisions, digital photo frames, gaming devices and the like. Examples of mobile communication devices may include cellular phones, smart phones, portable digital assistants (PDAs), pagers and the like. Examples of media devices may include media players, mobile digital assistants and the like. In an example embodiment, the at least one face is associated with at least one viewer of the media content. In an example embodiment, an image sensor, such as an image sensor 208 of apparatus 200 may be configured to receive the faces of the viewers as the input by performing detection of faces in its field of view. In an example embodiment, the image sensor may be switched to an ON state upon display of the media content to the users for detecting the faces of the viewers of the media content.

At block 404, a presence of the at least one face in the media content is determined. For example, on receiving one or more faces in its field of view as input by the image sensor, a presence of the one or more faces in the media content being displayed can be checked by comparing the one or more faces with the faces in the media content. In an example embodiment, determining the presence of the at least one face in the media content includes performing face recognition of the at least one face. If the presence of the face of one or more users is detected in the media content, then a modified display is generated at block 406. In an example embodiment, the modified display includes one of a panned image and a zoomed image of a user viewing the media content if the presence of the face of the user is determined in the media content.

In another example embodiment, if the presence of faces of the users is determined in the media content, then the modified display including a slide show presentation of the panned/zoomed image of the detected faces in the media content (as depicted in FIGS. 3B and 3C) may be generated and presented to the user for viewing purposes. In another example embodiment, if the presence faces of the users is determined in the media content, then the modified display including a tile format presentation of the panned/zoomed image of the detected faces (as depicted in FIGS. 3E and 3F) in the media content may be generated and presented to the user for viewing purposes. In an example embodiment, the media content may be modified to sepia tinted or a translucent form and the tile including panned/zoomed images of the detected faces in the media content displayed over the media content.

In one example embodiment, the media content may be a captured video content. On displaying the video content to users, the image sensor may perform face detection in its field of view for receiving one or more faces of viewers as input and comparing the received faces of the users with the video content being displayed. Modified display of the video content may be generated if the presence of the detected faces of the users is determined in the video content being displayed to the users. In one example embodiment, a user on viewing the displayed media content may provide the media content to another user for viewing purposes. The image sensor may perform face detection for the new user and determine a presence of the face in the displayed media content. If the presence of the face is determined in the media content, then a modified display may be generated for the new user for providing a personalized display of the media content.

In an example embodiment, a processing means may be configured to perform some or all of: receiving at least one face as an input, determining a presence of the at least one face in a media content, and generating a modified display of the media content if the at least one face is determined to be present in the media content. An example of the processing means may include the processor 202, which may be an example of the controller 108.

It will be understood that although the method 400 of FIG. 4 shows a particular order, the order need not be limited to the order shown, and more or fewer blocks may be executed, without providing substantial change to the scope of the present disclosure.

Without in any way limiting the scope, interpretation, or application of the claims appearing below, a technical effect of one or more of the example embodiments disclosed herein is to provide a personalized display of media content. Providing a personalized display of media content may refer to generation of modified display based on detected faces of viewers viewing the media content. Different forms of modified displays may be generated as exemplified in FIGS. 3B to 3F. Moreover, the modified displays may be configured to adjust to change in user viewing the media content and accordingly the modified display may be generated, thereby personalizing the display for the user. This enhances a user viewing experience.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   displaying a media content on a display of an apparatus, wherein the media content is an image;
   switching an image sensor to an ON state in response to the displaying of the media content on the display, wherein the image sensor is a camera coupled to the apparatus;
   detecting at least one face in a field of view of the image sensor;
   receiving, by the image sensor, the at least one face as an input in the apparatus;
   determining, by a processor, a presence of the at least one face in the displayed media content in the apparatus; and
   comparing the detected face in a field of view of the image sensor with the determined faces present in the media content for a match;
   generating, by the processor, a modified display of the media content if the at least one face is determined to be present in the media content, wherein the at least one face is that of at least one viewer of the media content, and wherein the determining, by the processor, of the presence of the at least one face in the displayed media content and the comparing the detected face in the field of view of the image sensor with faces present in the media content is performed while the media content is displayed at the display.

2. The method as claimed in claim 1, wherein determining the presence of the at least one face in the media content comprises performing face recognition of the at least one face.

3. The method as claimed in claim 1, wherein generating the modified display comprises panning or zooming the image to the at least one face.

4. The method as claimed in claim 1, wherein generating the modified display comprises presenting a slide show of the at least one face.

5. The method as claimed in claim 1, wherein generating the modified display comprises presenting the at least one face a tile format.

6. The method as claimed in claim 1, wherein generating the modified display comprises zooming the image to the at least one face.

7. An apparatus comprising:

at least one processor; and at least one memory comprising computer program code, the at least one memory and the computer program code configured to, with the at least one processor, cause the apparatus at least to perform:

display a media content on a display of the apparatus, wherein the media content is an image;

switching an image sensor to an ON state in response to the displaying of the media content on the display, wherein the image sensor is a camera coupled to the apparatus;

detect at least one face in a field of view of the image sensor;

receive, by the image sensor, the at least one face as an input;

determine, by the at least one processor, a presence of the at least one face in the displayed media content; and compare the detected face in a field of view of the image sensor with the determined faces present in the media content for a match;

generate, by the at least one processor, a modified display of the media content if the at least one face is determined to be present in the media content, wherein the at least one face is that of at least one viewer of the media content, and wherein the determining, by the processor, of the presence of the at least one face in the displayed media content and the comparing the detected face in the field of view of the image sensor with faces present in the media content is performed while the media content is displayed at the display.

8. The apparatus as claimed in claim 7, wherein determining the presence of the at least one face in the media content comprises performing face recognition of the at least one face.

9. The apparatus as claimed in claim 7, wherein the apparatus is further caused to panned or zoomed the image to at least one face to generate the modified display.

10. The apparatus as claimed in claim 7, wherein the apparatus is further caused to present a slide show of the at least one face to generate the modified display.

11. The apparatus as claimed in claim 7, wherein the apparatus is further caused to present the at least one face in a tile format to generate the modified display.

12. The apparatus as claimed in claim 7, wherein the apparatus comprises a communication device comprising:

a user interface circuitry and user interface software configured to facilitate a user to control at least one function of the communication device through use of a display and further configured to respond to user inputs; and a display circuitry configured to display at least a portion of a user interface of the communication device, the display and display circuitry configured to facilitate the user to control at least one function of the communication device.

13. The apparatus as claimed in claim 12, wherein the communication device comprises a mobile phone.

14. A computer program product comprising at least one non-transitory computer-readable storage medium, the computer-readable storage medium comprising a set of instructions, which, when executed by one or more processors, cause an apparatus at least to perform:

displaying a media content on a display of the apparatus, wherein the media content is an image;

switching an image sensor to an ON state in response to the displaying of the media content on the display, wherein the image sensor is a camera coupled to the apparatus;

detecting at least one face in a field of view of the image sensor;

receiving; by the image sensor, the at least one face as an input;

determining; by a first one of the one or more processors, a presence of the at least one face in the displayed media content; and comparing the detected face in a field of view of the image sensor with the determined faces present in the media content for a match;

generating, by the first one of the one or more processors; a modified display of the media content if the at least one face is determined to be present in the media content, wherein the at least one face is that of at least one viewer of the media content, and wherein the determining, by the processor, of the presence of the at least one face in the displayed media content and the comparing the detected face in the field of view of the image sensor with faces present in the media content is performed while the media content is displayed at the display.

15. The computer program product as claimed in claim 14, wherein determining the presence of the at least one face in the media content comprises performing face recognition of the at least one face.

16. The computer program product as claimed in claim 14, wherein generating the modified display comprises:

panning to the at least one face;

zooming to the at least one face image;

presenting a slide show of the at least one face; or presenting the at least one face in a tile format.

\* \* \* \* \*